United States Patent [19]

Bothwell

[11] Patent Number: 4,650,204

[45] Date of Patent: Mar. 17, 1987

[54] MOTORCYCLE WITH BUFFERS TO PROTECT USER'S LEGS

[76] Inventor: Peter W. Bothwell, "Meoncote" 114 Shipston Road, Stratford-upon-Avon, Warwickshire, England

[21] Appl. No.: 560,153

[22] Filed: Dec. 12, 1983

[30] Foreign Application Priority Data

Dec. 17, 1982 [GB] United Kingdom ................ 8235968

[51] Int. Cl.[4] .............................................. B62J 23/00
[52] U.S. Cl. ................................ 280/289 G; 296/78.1
[58] Field of Search ........................ 280/289 G, 281 B; 296/78.1

[56] References Cited

U.S. PATENT DOCUMENTS 3,901,549  8/1975  Ramirez ............................. 296/78.1

FOREIGN PATENT DOCUMENTS

| 201455 | 1/1959 | Fed. Rep. of Germany ..... 296/78.1 |
| 560628 | 4/1957 | Italy .................................... 296/78.1 |
| 161680 | 4/1921 | United Kingdom ............... 296/78.1 |
| 1547558 | 6/1979 | United Kingdom ............... 296/78.1 |
| 2088800 | 6/1982 | United Kingdom . |

Primary Examiner—John J. Love
Assistant Examiner—Charles R. Watts
Attorney, Agent, or Firm—Parmelee, Miller, Welsh & Kratz

[57] ABSTRACT

A motorcycle has collapsible buffers which normally lie outside the legs of a rider and passenger but can swing outwardly to release the legs. Outward swinging of the buffers is resiliently opposed.

7 Claims, 5 Drawing Figures

MOTORCYCLE WITH BUFFERS TO PROTECT USER'S LEGS

FIELD OF THE INVENTION

This invention relates to motorcycles, scooters, mopeds and other like two-wheeled motorised vehicles which are referred to herein generically as motorcycles.

BACKGROUND OF THE INVENTION

A motorcycle is usually provided at opposite sides thereof with leg shields for the rider. These leg shields have rearwardly directed faces disposed in front of the positions to be occupied by the rider's legs so as to protect them primarily against front impacts. An example of a motorcycle with leg shields is described in my British Patent Application No. 2,088,800 published June 16, 1982. In an accident, it is desirable that the rider's legs should be protected against side impacts as well as front impacts. It is also desirable that the legs of any passenger on the motorcycle should be protected against side impacts. On the other hand, it is desirable that the legs of neither rider nor passenger should be trapped on the motorcycle after an impact, for example in the event of the rider and passenger being thrown from the motorcycle.

SUMMARY OF THE INVENTION

A motorcycle in accordance with the one aspect of the invention has means for defining the boundary of a position to be occupied by each leg of a rider and including a leg shield in front of said position and a collapsible buffer in a location at a side of said position remote from a chassis of the motorcycle, and holding means for holding the buffer in said location relative to the chassis, the holding means including a resiliently yieldable connector which yields resiliently to permit movement of the buffer under the action of a force exerted on the buffer and directed away from the chassis.

The buffer is collapsible only under application of substantial force and is therefore capable of absorbing energy in an impact. The connector yields resiliently to permit movement of the buffer away from the chassis under the action of a force which is insufficient to cause significant collapse of the buffer.

According to a further aspect of the invention, a motorcycle has means for defining the boundary of a respective position to be occupied by each leg of a passenger on the motorcycle and including a collapsible buffer in a location at a side of said position remote from a chassis of the motorcycle and holding means for holding the buffer in said location relative to the chassis, including a resiliently yieldable connector which yields resiliently to permit movement of the buffer under the action of a force exerted on the buffer and directed away from the chassis.

DETAILED DESCRIPTION

Figure 1:
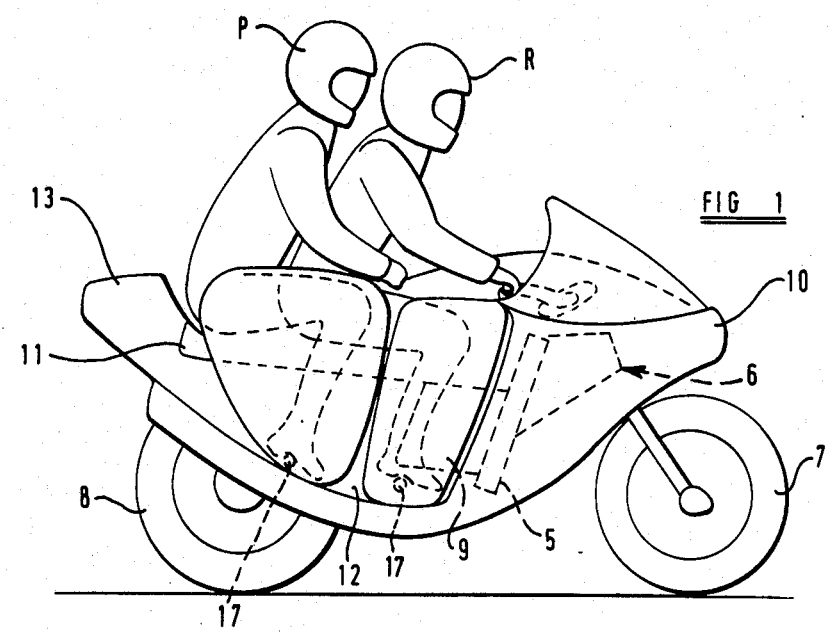
FIG. 1 illustrates diagrammatically in side view one example of a motorcycle embodying both aspects of the invention.

The motorcycles illustrated in the drawings are generally of the form described and illustrated in the specification and drawings of my United Kingdom Pat. No. 1,515,663.

Each motorcycle has a chassis 6 comprising a transverse bulkhead 5 with a forwardly extending section and a rearwardly extending section which are supported, respectively, by a front wheel 7 and a rear wheel 8. The chassis has a fairing 10 enclosing the front section and constructed to absorb at least some of the energy of front impact. Handlebars of a front wheel steering head extend through apertures (not shown) in the fairing. The rear section is enclosed by a padded seat 11 for a rider R and a pillion passenger P and by a fairing 12, and the seat has associated therewith a body 13 which is deformable to absorb at least some of the energy of a rear impact. The bulkhead has two rearwardly extending spaced plates at opposite sides of an opening therein in which an engine 9 and a gearbox (not shown) are mounted so as to be supported by the bulkhead and the plates.

The padded seat 11 is supported by the rear section of the chassis and is disposed rearwardly of the bulkhead. The seat has a top portion 14, downwardly extending side portions 15 and laterally projecting front portions 16 which are attached to the side portions of the rear face of the bulkhead and provide rearwardly facing leg shields 16. Footrests 17 are provided on the chassis for the rider and the passenger.

Each of the leg shields 16 which are disposed in front of the positions occupied by the rider's legs has associated therewith a leg protector comprising a buffer part 18 of a construction such that when subjected to an impact it collapses and absorbs at least some of the energy of the impact. Each leg protector is secured to the fairing 10 or to the chassis 6 and the buffer part extends rearwardly from a location adjacent the outer edge of the associated leg shield 16 alongside the space behind the leg shield occupied by a knee, lower leg and foot of the rider.

The buffer parts 18 are therefore arranged to protect the rider's legs against side impacts perpendicular to the longitudinal axis of the cycle and angled impacts at an acute angle to said axis. Thus, for example, in an angled impact of the cycle with a motor car or a side impact of a car with the cycle, the buffer part concerned is pressed inwardly against the rider's leg and absorbs at least some of the energy of the impact. On separation of the buffer part from the impacted object, the leg is released and may be urged outwardly, particularly if the rider is thrown from the motorcycle. The buffer part is arranged to swing outwardly towards or to the position shown by a broken line in FIG. 2 under pressure exerted by the leg so that the leg is not trapped behind the leg shield.

The rider's legs are protected against front impacts by the leg shields 16.

Figure 2:
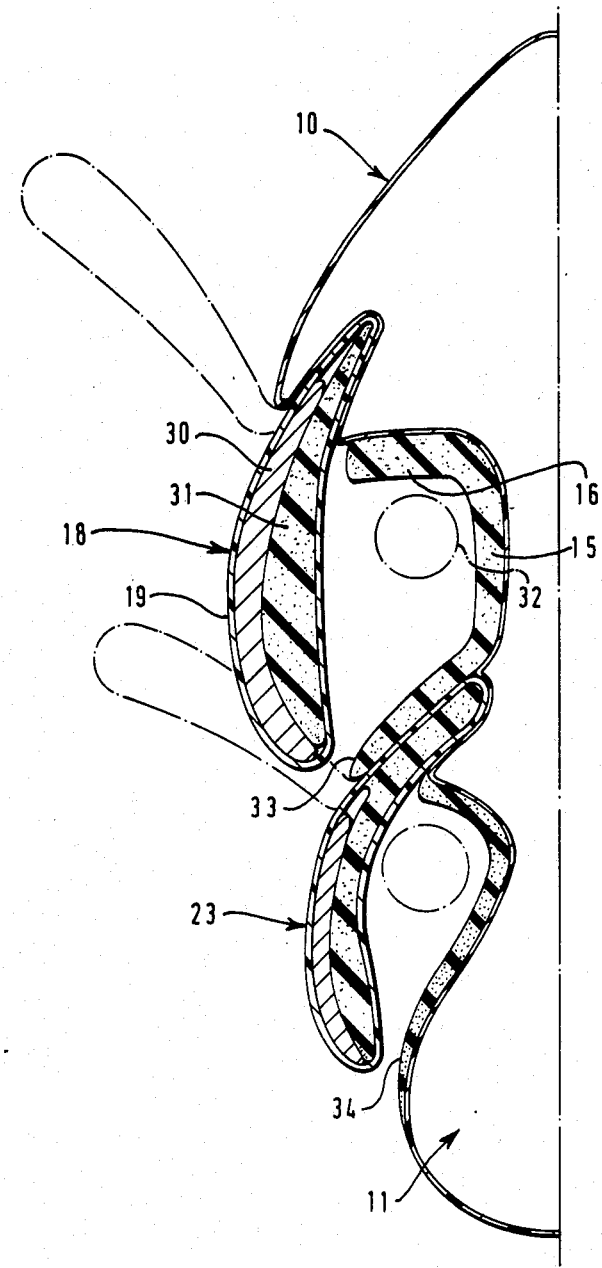
FIG. 2 is a plan view of a part of the motorcycle, certain components being shown in cross-section in a horizontal plane and the positions occupied by one leg of a rider and one leg of a passenger being indicated.

The buffer parts 18 are each connected to the fairing 10 or to the chassis or between the fairing and the chassis by a relatively stiff, resiliently flexible "hinge" connector 21 which normally maintains it in position alongside the rider's leg but which is capable of flexing under outwards pressure from the leg so that the buffer part can swing outwardly. As shown in FIG. 2, in a case where the connector abuts the fairing 10, but is spaced from the chassis, the connector extends forwardly from the buffer part 18 into the fairing. In each of these three alternative arrangements, a part of the fairing lies laterally outwardly of the connector.

The connector 21 of each buffer part 18 may be a piece of a material connected to the buffer part and secured to the fairing 10 and/or chassis. In one example (not shown) the piece of material is a reinforced Neoprene sheet sandwiched between parts of the fairing and attached to these parts by adhesive and/or bolts or rivets and spreader plates or washers. Alternatively, as shown in FIG. 2, the connector may be integral with an outer layer of the buffer part.

Each buffer part 18 comprises a hollow envelope 19 of a flexible material, for example moulded rubber or plastics, optionally incorporating a reinforcement such as an interwoven fabric to prevent tearing. The envelope contains a relatively stiff, tough plate 30. As shown in FIG. 2, this plate is curved, at least as viewed from above, the plate presenting a convex face outwardly of the motorcycle. The remainder of the envelope is filled with a body 31 which lies at the inner side of the plate 30 and has a thickness greater than that of the plate.

The plate 30 is formed of material selected to resist penetration by a vehicle which collides with the motorcycle and to promote deflection of such vehicle and sliding along the buffer part of any part of the vehicle which comes into contact with the buffer part. The plate 30 is required to resist gross intrusion by a colliding vehicle into the space behind the leg shield 16 occupied by the rider's leg, indicated by the reference numeral 32. The material sold under the designation "KEVLAR" by Du Pont is a suitable material for use in the plate 30, which may comprise more than one layer of this material. The material of which the body 31 is formed is capable of collapsing, when subjected to a substantial force. A suitable material for this body is a dense plastics foam. It will be understood that the action of the buffer part 18, when subjected to impact with a stationary object, will be substantially the same as its action when subjected to impact with a moving vehicle. A buffer part having the qualities hereinbefore mentioned is useful in both of these circumstances.

The envelope 19 may contain air at atmospheric pressure and be provided with normally closed venting means adapted, in the event of an increase in the air pressure above a predetermined value resulting from an impact against the buffer part, to permit the escape of air from the buffer part at a controlled rate whereby at least some of the energy of the impact is absorbed.

Figure 3:
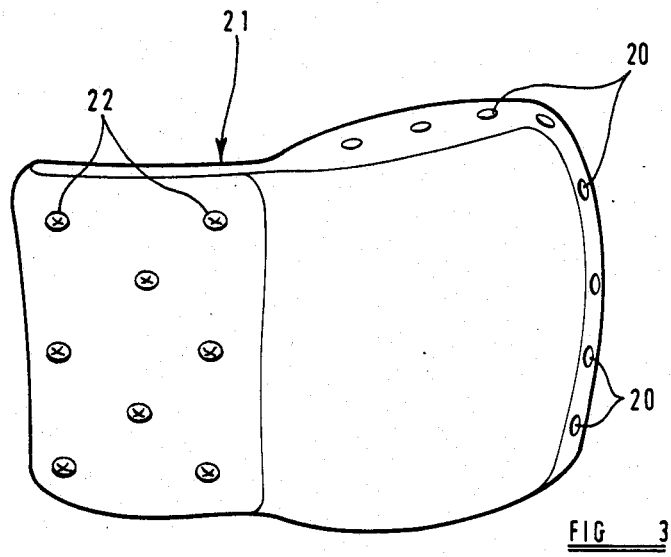
FIG. 3 is a perspective view showing a buffer of the motorcycle and holding means therefor.

FIG. 3 shows a buffer part of the latter form, the venting means being a number of vent holes 20 formed around the periphery of the buffer part. Also seen in this Figure are several spreader plates 22 used with securing bolts or rivets which extend through holes formed in the connector 21.

Each buffer part may be adapted to collapse in an irreversible manner when subjected to impact. Alternatively, the buffer part may be adapted to collapse in a reversible manner and either recover its initial condition automatically or be capable of being reinstated in its initial condition. In each case, the buffer part acts as an energy-absorbing barrier between the leg concerned and any object with which the leg would otherwise suffer impact.

Figure 4:
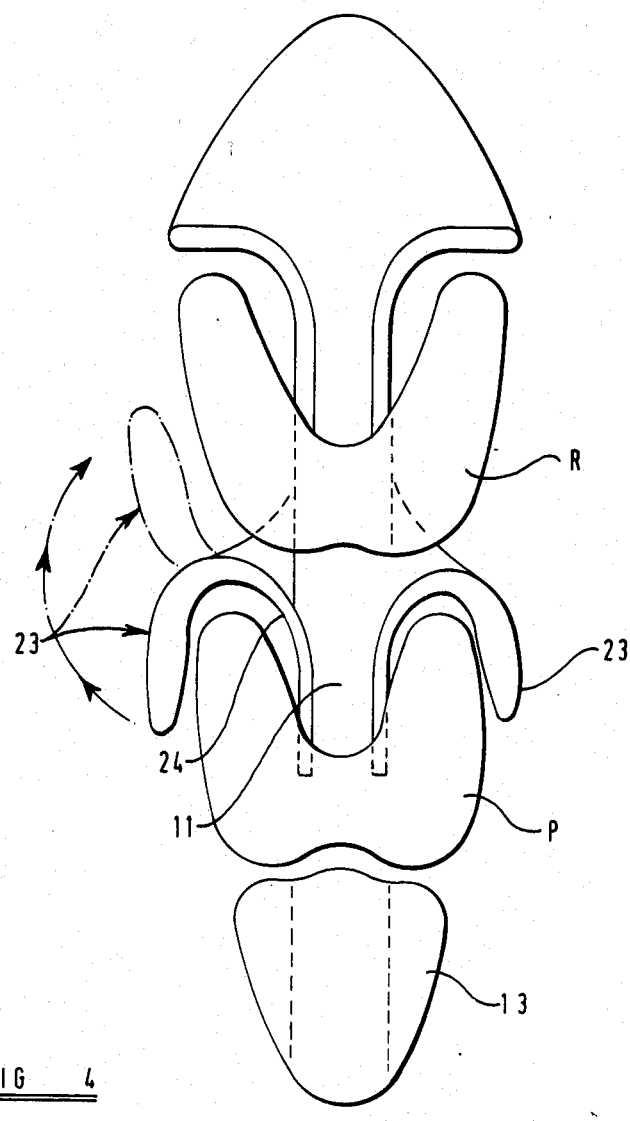
FIG. 4 is a plan view of part of a further example of motorcycle in accordance with the invention, showing buffers for a pillion passenger.
Figure 5:
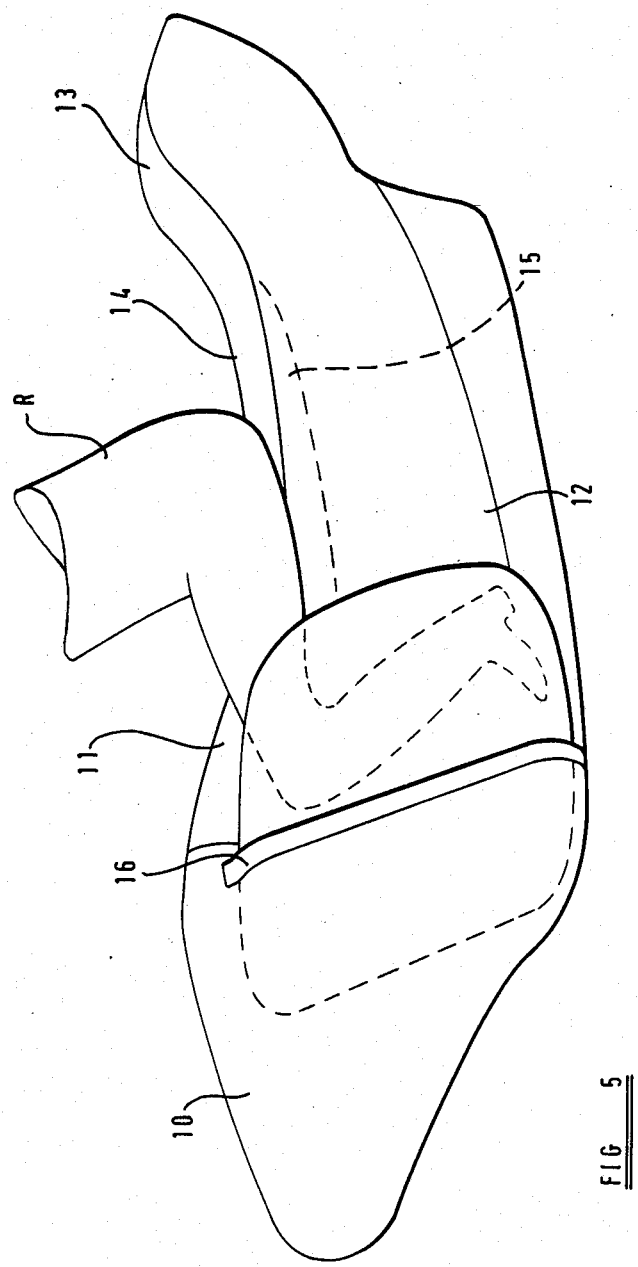
FIG. 5 is a perspective view of certain parts of the motorcycle, together with a part of a rider.

FIG. 4 shows a motorcycle fitted with two leg protectors for a pillion passenger. Each protector comprises a buffer part 23 of a similar construction to the buffer parts 18 and connected by a resiliently flexible connector 24 similar to the connector 21 to the relevant side face of the seat 11 or the fairing 12 (or if desired a part of the chassis). Each leg protector therefore extends from a location inwardly of the position occupied by the leg, transversely in front of this position and then rearwardly alongside the leg, being formed to conform to the contour of the knee.

The degree of flexibility of the flexible connectors 21, 24 required to permit outwards movement of the buffers under forcible outwards movement of the legs in a crash and yet to ensure that the buffers are normally maintained in position without flapping in the airstream will be determined experimentally. The buffers 18 and 23 will move outwardly, that is away from the chassis of the cycle, when subjected to a force which is less than the minimum force which will cause significant collapse of the buffers. The buffers will collapse only when subjected to a substantial force; whereas the buffers can be moved outwardly relatively easily.

There is provided, for each leg protector, one or more abutments engageable by the buffer part of that leg protector when the buffer part is in the datum position illustrated in the drawings or is displaced slightly in the inward direction from the datum position. The flexible connectors 21 and 24 may be arranged to urge the buffer parts against the abutments so that outward movement of a buffer part will not occur until there is exerted on the buffer part an outwardly directed force which exceeds a predetermined threshold magnitude. This threshold would normally be selected to ensure that the rider and/or pillion passenger can readily remove either foot from the associated footrest and place his foot upon the ground, thereby resiliently displacing the buffer part. The buffer part will automatically be returned to its datum position by the resilient connector when the rider or pillion passenger returns his foot to the footrest or dismounts from the motorcycle.

As shown in FIG. 2, each buffer part 18 is engageable with an abutment 33 disposed adjacent to a rear edge of the buffer part. The abutment 33 is constituted by a continuation of the side portion 15. This side portion is supported by the fairing 12 from the chassis 6. It will be noted that the surface of the side portion 15 which extends outwardly to the abutment 33 and which is prevented generally towards the position occupied by the leg 32 is inclined at an angle considerably greater than 90° to a longitudinal centreline of the motorcycle. There is no surface to the rear of the leg position 32 which is substantially at right angles to the longitudinal centreline and against which the leg could be trapped. In the event of the rider's leg being forced rearwardly in a collision, the leg slides along the side portion 15 and is deflected outwardly towards the rear edge of the buffer part 18, to pass between the buffer part and the abutment 33. Neither the buffer part nor the abutment significantly impedes such movement of the leg.

As shown in FIG. 2, buffer parts 23 provided for a passenger on the motorcycle have a construction similar to that of the buffer parts 18 and an abutment 34 for engagement with a rear edge of the buffer part 23 is provided by the side portion 15. Again, the surface of the side portion 15 along which a leg could slide to the abutment 34 is inclined at an angle much greater than 90° to a longitudinal centreline of the motorcycle.

The connector of the buffer part 23 may be trapped between opposed surfaces of the side portion 15 which define a slot in which the connector is received.

It will be noted that the leg protectors are supported at positions spaced laterally outwardly from a longitudinal centreline of the motorcycle. Accordingly, the chassis of the motorcycle is required to extend a substantial distance laterally outwardly from the longitudinal centreline or other components securely mounted on the chassis and having sufficient strength to support the leg protectors adequately are required to extend substantially in the laterally outward direction from the longitudinal centreline.

It will be noted that, whilst the hinge connector of each buffer part to a further part of the motorcycle provides for swinging of the buffer part along an arc from its datum position, as represented by the arrow in FIG. 2, the connector can flex in other ways, for example to permit twisting of the buffer part about an axis which is generally parallel to the plane of the arc in which the buffer part swings. The freedom of the buffer part to move in various ways relative to the remainder of the motorcycle facilitates withdrawal of the foot and leg concerned from its normal position adjacent to the inner side of the leg protector and reduces the risk of the leg or foot becoming trapped by the motorcycle.

I claim:

1. A motorcycle having a steerable front wheel, a drivable rear wheel, a chassis which is straddled by a rider in use, a motor mounted on the chassis for driving the rear wheel, a seat on the chassis, a fairing attached to a forward portion of the chassis, leg protector means extending outwardly from the chassis for defining a boundary of a position to be occupied by the rider who straddles the chassis, said leg protector means including a leg shield portion in front of said leg occupying position and attached to the fairing and further including a buffer portion in a location spaced outwardly from said chassis, said buffer portion comprising a plate for resisting gross intrusion by a colliding object into the position to be occupied by the leg of the rider and a further part which is deformable under impact so as to absorb at least some of the energy of an impact, and further including holding means for attaching the buffer portion to the fairing and for holding said buffer in said spaced location relative to the chassis, the holding means including a resiliently yieldable connector which yields resiliently to permit movement of the buffer under the action of a force exerted on the buffer and directed away from the chassis to permit entry to and exit from the leg occupying position.

2. A motorcycle according to claim 1 wherein each buffer extends rearwardly from its corresponding leg shield portion, the connector extends forwardly from the buffer and the fairing lies partly at the side of the connector remote from the chassis.

3. A motorcycle according to claim 1 wherein said connector is capable of accommodating swinging of the buffer relative to the chassis along a substantially horizontal arc and of accommodating twisting of the buffer relative to the chassis about an axis which is at least approximately parallel to a plane containing that arc.

4. A motor cycle according to claim 1 further comprising an abutment at the rear of and adjacent to said position for engagement by a rear marginal portion of the buffer to limit travel of said rear marginal portion towards the chassis.

5. A motorcycle having a steerable front wheel, a drivable rear wheel, a chassis which is straddled by a rider in use, a motor mounted on the chassis for driving the rear wheel, a seat on the chassis, means for defining the boundary of a position to be occupied by each leg of a rider who straddles the chassis, said means including a leg shield attached to the motorcycle in front of and adjacent to said leg occupying position and a buffer in a location remote from the chassis and at a side of and adjacent to said position and having holding means for connecting the buffer to the motorcycle and for holding the buffer in said location relative to the chassis, the holding means including a resiliently yieldable connector for resiliently opposing movement of the buffer under the action of a force exerted on the buffer and directed away from the chassis, wherein said buffer comprises means for yieldably resisting collapsing of the buffer when subjected to a force directed towards the chassis and wherein each buffer extends rearwardly from the corresponding leg shield, the resiliently yieldable connector extends forwardly from the buffer and there is provided a fairing attached to the chassis having a portion which lies partly at the side of the yieldable connector and spaced outwardly from the chassis.

6. A motorcycle according to claim 5 wherein said holding means is connected with the chassis at a location at an inner side of said position and extends around the front of said position to the buffer.

7. A motorcycle comprising a steerable front wheel, a drivable rear wheel, a chassis which is supported on the front and rear wheels and is straddled by a rider and by a passenger, in use, a motor mounted on the chassis for driving the rear wheel, a seat on the chassis for the rider and the passenger, means for defining a boundary of a respective position to be occupied by each leg of the rider who straddles the chassis and a boundary of a respective position to be occupied by each leg of the passenger who straddles the chassis and including a respective buffer in a location at a side of each said position remote from the chassis and holding means for connecting the buffer to the motorcycle and for holding each buffer in said location relative to the chassis, the holding means including a resiliently yieldable connector which yields resiliently to permit movement of the buffer under the action of a force exerted on the buffer and directed away from the chassis and wherein there is provided at each side of the chassis and attached to the chassis between said positions occupied by each leg of said rider and between said positions occupied by each leg of said passenger, an abutment engageable with a rear marginal portion of the buffer adjacent said position defined for the leg of the rider to limit movement of the buffer towards the chassis, said buffer being free to swing away from said abutment.

* * * * *